United States Patent

Bifulco, Jr.

[15] 3,646,337
[45] Feb. 29, 1972

[54] APPARATUS FOR PROCESSING ANGULAR DATA

[72] Inventor: Harry P. Bifulco, Jr., Huntington, N.Y.

[73] Assignee: North Atlantic Industries Inc., Plainview, N.Y.

[22] Filed: Sept. 29, 1969

[21] Appl. No.: 861,879

[52] U.S. Cl. ................................235/186, 318/637, 318/654, 318/661
[51] Int. Cl. .........................................................G06g 7/22
[58] Field of Search............340/347 SY; 318/637, 654, 661; 323/43.5; 235/186, 197

[56] References Cited

UNITED STATES PATENTS 3,250,905  5/1966  Schroder et al..................340/347 SY

*Primary Examiner*—Eugene G. Botz
*Assistant Examiner*—R. Stephen Dildine, Jr.
*Attorney*—Morgan, Finnegan, Durham & Pine

[57] ABSTRACT

Resolver apparatus is disclosed employing a system which receives resolver inputs $R\sin\theta$ and $R\cos\theta$ and is adjusted according to coarse and fine processor angles $\alpha_c$ and $\alpha_f$ to achieve a measurement of, or facilitate operations on, the resolver input angle $\theta$. The apparatus employs two computing channels, one for each resolver input, a function generator circuit for developing tangent (or cotangent) functions of $\alpha_c$, a linear interpolator in one of the channels, and circuits interconnecting the channels so that the signals ultimately developed in the channels bear a relationship which permits one of them to be linearly interpolated as a function of $\alpha_f$ while maintaining an interpolating angle error characteristic which is small and independent of $\alpha_c$. A simple passive compensating technique may be employed to take advantage of this characteristic to produce a highly accurate response. Three of the embodiments employ tapped and switched dividers to generate the tangent functions while a fourth exploits those values of $\alpha_c$ which reduce the tangent functions to zero of unity, thereby permitting the use of simple combining circuits for function generation.

64 Claims, 4 Drawing Figures

APPARATUS FOR PROCESSING ANGULAR DATA

This invention relates to bridge apparatus which receives input angular data, for example, resolver input data in the form $R\sin\theta$ and $R\cos\theta$, and which processes same, e.g., by computing the value of $\theta$ in digital form.

Since a resolver bridge is in essence a control transformer, the term resolver bridge as used herein contemplates input angle measuring bridges, deviation-type bridges, programmed bridges including those used for coordinate rotation and differential resolver functions, and systems providing other functions typical of control transformer applications such as those relating to phase shifting and the like.

In a typical direct angle reading arrangement, the system is adjusted by a processor angle $\alpha$ and is instrumented such that when a predetermined condition exists, the processor angle is equal to the input angle and is therefore a measurement of same.

The inputs to angle-measuring resolver bridge apparatus consist of two input functions $R\sin\theta$ and $R\cos\theta$ each having two unknowns or variables, amplitude $R$ and angle $\theta$. It is therefore necessary to process two computing functions of the input variables and the processor angle $\alpha$, thereby to obtain the correct value of the input angle $\theta$ or to perform some operation thereon.

For example, when the function $R\cos\theta\tan\alpha$ equals the function $R\sin\theta$, then the processor angle $\alpha$ indicates and is equal to the input angle $\theta$.

In mechanizing solutions to obtain a direct indication of input angle $\theta$, it is necessary to generate trigonometric functions of the angle $\alpha$. The function $\tan \alpha$, above, is one example, another is found in the system which utilizes the functions:

$$F_1 = R\cos\theta\sin\alpha$$
$$F_2 = R\sin\theta\cos\alpha$$

When $F_1$ equals $F_2$, $\alpha$ equals Here the processor angle functions $\sin \alpha$ and $\cos\alpha$ must be generated.

In both of the above examples, the functions of the processor angle $\alpha$ are trigonometric. Such functions can give rise to limitations in systems which are required to compute the input angle $\theta$ to a high degree of accuracy for a multiplicity of values, e.g., 100,000 increments. In such systems the processor angle must be adjustable to the same degree of resolution. While this order of resolution can readily be achieved in generating linear functions, practical limitations involving cost, size, weight and complexity are encountered in achieving comparable resolution in the generation of trigonometric functions.

One approach to this problem relies on the above relationship $\theta=\alpha$, when $R\sin\theta\cos\alpha=R\cos\theta\sin\alpha$, and utilizes trigonometric function generators of a coarse processor angle, together with linear interpolating techniques, to refine the coarse angle functions with smaller angular increments to achieve the $\cos\alpha$ and $\sin\alpha$ terms. For example, one can generate sine and cosine functions of coarse adjustment angles which occur in, say, 10-degree increments, e.g., 0°, 10°, 20°..., and then interpolate each of the two functions over the coarse angle increments with successively smaller fine angle increments utilizing precision dividers. However, these dividers normally interpolate linearly rather than trigonometrically, thereby introducing an error. For example, the sinusoidal voltage $e=\sin\alpha$ does not vary linearly with $\alpha$ over any interval and moreover the departure from linearity depends upon the location of the particular interpolating interval.

Compensation for this error is thus complicated because the amount of compensation depends on the particular interpolating interval.

An effective solution to this problem is disclosed in the copending application of John Heaviside, filed Mar. 20, 1964 Ser. No. 353,558 now Pat. No. 3,493,735 and entitled, "Computer Circuits For Processing Trigonometric Data." Disclosed therein is an interpolating technique which exploits the readily obtained high precision and resolution of linear interpolating dividers while at the same time limiting interpolation error. The technique also facilitates simple compensation for those errors that do exist.

The technique disclosed therein involves the establishment of a coarse angle value $\alpha_c$* (*The Heaviside application uses a somewhat different notation scheme.) which in general is different from the input angle $\theta$, the difference being $\Delta\alpha$ where $\alpha_c$ has the value immediately below $\theta$. The coarse angle modifies the input functions of $R$ and $\theta$ to facilitate the derivation of two computing signals. Both signals in the illustrative embodiment of Heaviside are functions of $R$ and their ratio is independent of $R$ and a function of the variable, $\Delta\alpha$, above.

The two computing signals, designated $e_a$ and $e_r$ in the Heaviside application, are derived to have characteristics such that one of them, $e_r$, can be interpolated using cascaded linear dividers adjusted by a set of fine processor angles of successively smaller increments totaling $\alpha_f$. This part of the processing operation may be regarded as multiplying the signal $e_r$ by a linear function of $\alpha_f$ to obtain a new signal containing the product $\alpha_f \cdot e_r$, which signal is so related to the other original signal $e_a$, that when they are equal, variable $R$ vanishes and $\alpha_f$ closely approaches a linear relationship to $\Delta\alpha$.

Accordingly, the net processor angle adjustment $\alpha$, which is the sum $[\alpha_c+\alpha_f]$, approaches true proportionality with the input angle $\theta$ and, with proper calibration, thereby indicates the value of $\theta$.

The above system provides several important advantages, one being the need to interpolate only one function and another being the relative ease with which the interpolated function may be compensated because the interpolation angular error is independent of the coarse angle setting.

The present invention represents further improvements in the foregoing technique and has for an object the attainment of material circuit simplifications, realizable without loss of the above-mentioned constant error characteristic.

It is another object of this invention to simplify the switching arrangements in resolver bridge systems while preserving high accuracy and resolution.

A further object of the invention is to configure the bridge system to exploit the capabilities of operational amplifiers.

A still further object of the invention is to provide a resolver bridge system adaptable to large scale integration techniques.

Other objects of the invention are to provide a bridge (1) which is operable over a wide range of frequencies including DC, (2) which eliminates the shortcomings associated with inductive elements, and (3) which by virtue of their absence is particularly amenable to automatic operation.

Other objects and advantages of the invention will be apparent in the description which follows.

Serving to illustrate exemplary embodiments of the invention are the drawings of which:

Figure 1:
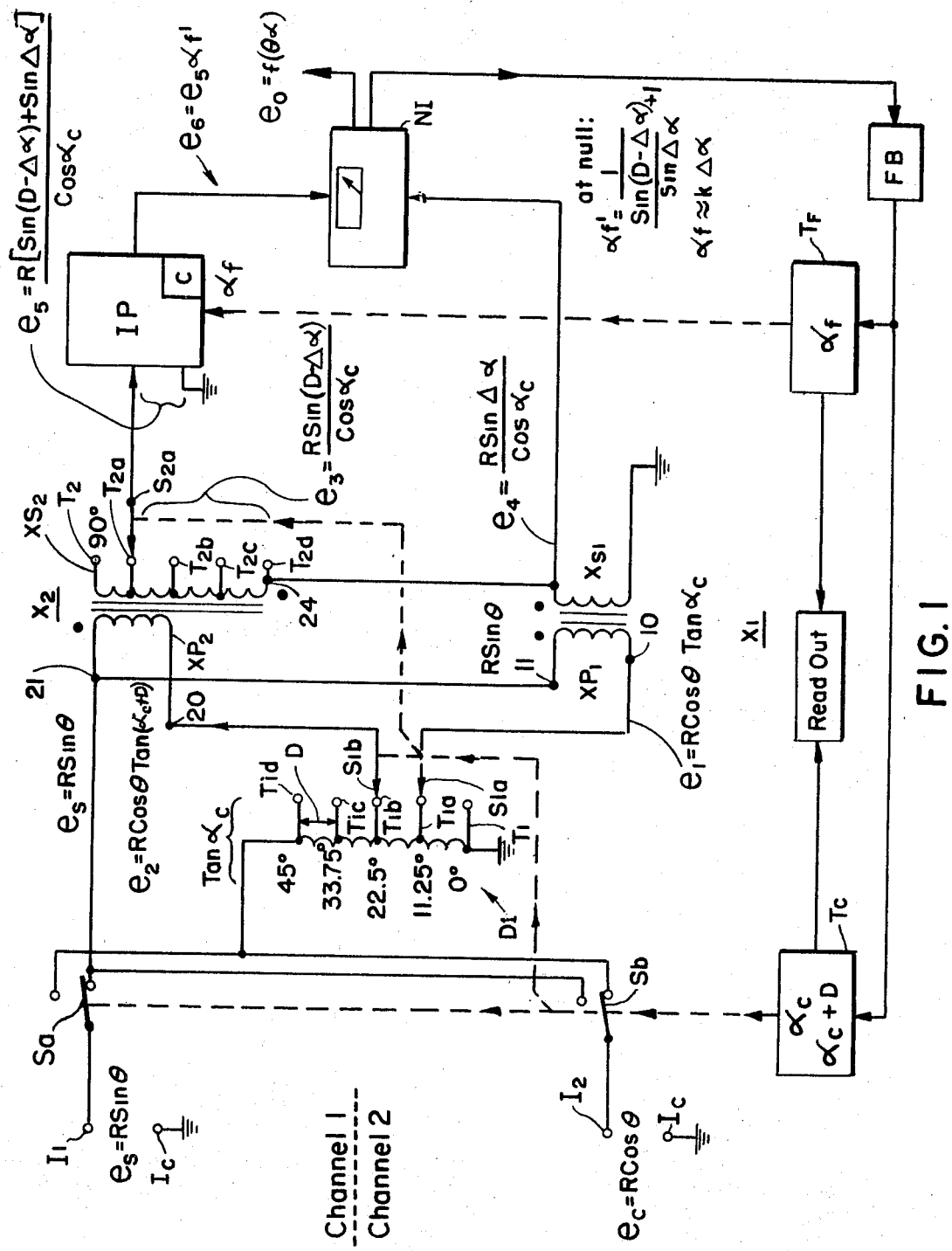
FIG. 1 is a schematic diagram of a first embodiment of the invention.

The system of FIG. 1 receives resolver inputs in the form of a voltage $e_s=R\sin\theta$, applied to input terminals $I_1$ and $I_C$, of channel 1 and a second voltage $e_c=R\cos\theta$ which appears at input terminals $I_2$ and $I_C$ of channel 2. These inputs are operated on with functions of a coarse processor angle $\alpha_c$ and fine processor angle $\alpha_f$, derived from respective switching control units $T_C$ and $T_F$, such that the sum of the values $\alpha_c$ and $\alpha_f$ necessary to establish a null condition, is equal to the input resolver angle $\theta$.

The resolver inputs $e_s$ and $e_c$ are connected to respective arms of two ganged switches $S_a$ and $S_b$, the sine input $e_s$ appearing at $S_a$ and the cosine input $e_c$ at switch $S_b$. The switches have two positions and are controlled by the coarse processor angle $\alpha_c$ to be in the position shown in the range 315° to 45° and 135° to 225°, and to be switched to the alternate position in the other intervals.

The data flow described below will represent the case where the processor angle $\alpha_c$ is in the first mentioned ranges 315° to 45° or 135° to 225°, it being understood that the resolver inputs are effectively interchanged and other switching effected in the interval 45° to 135° and 225° to 315° as explained more fully hereinafter.

Under the illustrated conditions, the sine resolver input $e_s$ is connected to the primary $XP_2$ of a transformer $X2$ while the cosine resolver input $e_c$ is connected to an inductive divider $D1$ having a group of taps $T_1$, $T_{1a}$, $T_{1b}$ arranged in quarter octant (11.25°) increments. Switchable contacts $S1_a$ and $S1_b$ are controlled by the coarse processor angle $\alpha_c$ derived from $T_C$, thereby selectively contacting two adjacent taps $T_1$, $T_{1a}$, then $T_{1a}$, $T_{1b}$, etc., to thereby respectively simulate $\tan \alpha_c$ and $\tan (\alpha_c + D)$ where D represents the coarse angle increment of 11.25°. The same simulation occurs in the range 135° to 225° while in the other intervals, the divider D1 generates the function cotangent $\alpha_c$ with the switching proceeding in the reverse (downward) order.

Since D1 has been energized by $R\cos\theta$ in the assumed case, a voltage $e_1$ appears at arm $S1_a$ of the divider which represents the function $R\cos\theta \tan\alpha_c$, while at $S1_b$ a voltage $e_2$ representing the function $R\cos\theta \tan(\alpha_c + D)$ is generated.

The voltage $e_2$ appearing at arm $S1_b$ is applied to one terminal 20, of the primary $XP_2$ of the transformer $X2$ while, as previously noted, the other end 21 of the primary is connected to the resolver sine input $e_s$ via switch $S_a$. These two signals $e_s$ and $e_2$ are thus subtracted with the difference appearing across the secondary $XS_2$ of the transformer $X2$.

The secondary $XS_2$ is also tapped at 11.25° increments with the taps $T_2$, $T_{2a}$..., being selectively contacted by the switch arm $S2_a$ in accordance with the value of the selected coarse angle. The tap distribution is adjusted according to the function $$\frac{\cos(\alpha_c + D)}{\cos \alpha_c}.$$

As a consequence, over the ranges 315° to 45° and 135° to 225°, there appears in channel 1 at the arm of $S2_a$ relative to the end terminal 24, a voltage $e_3$, where:

$$e_3 = \frac{R \sin(D - \Delta\alpha)}{\cos \alpha_c}$$

The factor $\Delta\alpha$ represents the coarse error, i.e., $\theta - \alpha_c$. This voltage constitutes a part of the input signal to a linear interpolator IP which may take any one of a number of suitable forms, e.g., known cascaded resistive dividers, or switched operational amplifier arrangements as described hereinafter.

Referring back to the divider D1, it may be seen that the switch arm $S1_a$ which develops the signal $R\cos\theta\tan\alpha_c$, is connected to one end 10 of the primary $XP_1$ of a transformer $X1$. The other terminal 11 of the primary is energized by the resolver input, $R\sin\theta$, so that the net primary voltage represents the difference between these two quantities. This difference appears across the secondary $XS_1$ of $X1$ and over the ranges mentioned above is the function:

$$e_4 = \frac{R \sin \Delta\alpha}{\cos \alpha_c}$$

Since one terminal of the interpolator IP is grounded as is one terminal of secondary $XS_1$, the net voltage applied to the interpolator represents the sum of (1) the voltage $e_3$, appearing at $S2_a$ across $XS_2$, and (2) the voltage $e_4$ across the secondary $XS_1$ of $X1$. This sum is accordingly representative of the function:

$$e_5 = \frac{R[\sin(D - \Delta\alpha) + \sin \Delta\alpha]}{\cos \alpha_c}$$

The interpolating circuit IP is adjusted by the setting of the fine angle, $\alpha_f$, and includes means, schematically indicated by c, for compensating the linear interpolator to account for the interpolating error.

The output $e_6$ of the interpolator represents the interpolator input function $e_5$ multiplied by the normalized fine trial angle factor $\alpha_f'$ where $\alpha_f' = \alpha_f/D$ and D is the interpolating interval. This output is applied as one input to a null detector circuit NI. The other input to the null detector is the signal $e_4$ appearing across $XS_1$. When the coarse and fine processor angles are set to establish the null as indicated or detected at the null indicator, and assuming no compensation c, then:

$$e_4 = e_6 \text{ and}$$

$$\alpha_f' = \frac{1}{\frac{\sin(D - \Delta\alpha)}{\sin \Delta\alpha} + 1} = F_n$$

where $F_n$ is defined as the null function or $$\alpha_f \approx k \Delta\alpha,$$

where k is a constant coefficient.

Since under these conditions the fine angle $\alpha_f$ is closely proportional to the difference between the input angle $\theta$ and the coarse processor angle $\alpha_c$, i.e. to $\Delta\alpha$, then the sum of the coarse and fine processor angle values equals the input angle $\theta$ within the error characteristic described below. In other words, at null
$\alpha_f = \theta - \alpha_c$, and
$\alpha_f + \alpha_c = \theta$ By reading the null values of the coarse angle as generated at switch control $T_C$ and the fine angle generated by switch control $T_F$, the angle $\theta$ may be indicated.

An analysis of the foregoing arrangement will show that without compensation C, the system angular error due to the use of a linear interpolator IP varies in "S"-shaped manner over the interval D and is independent of the coarse angle $\alpha_c$ as described in the aforesaid Heaviside application. The error is zero at $\alpha_f = 0$, D/2 and D and in the case of D=11.25°, has a maximum value of about 25″ at approximately the D/4 and 3D/4 points. Correction may be made in interpolator IP at the nonzero interpolation points occurring over the 11.25° interval, greatly reducing system error. This correction can be introduced for example by varying the linearity of the interpolator, as by changing divider tap position; or, where operational amplifiers are used, the values of certain of the input resistances may be modified over the values they would have in a purely linear case.

Considering now the intervals 45° to 135° and 225° to 315°, analysis will show that the null function $F_n$ is still applicable while the other functions are translated into cofunctions.

The relationships are as follows:

| 315°–45°; 135°–225° | 45°–135°; 225°–315° |
|---|---|
| $e_1 = R \cos \theta \tan \alpha_c$ | $e_1' = R \cos \theta \cot \alpha_c$ |
| $e_2 = R \cos \theta \tan(\alpha_c + D)$ | $e_2' = R \cos \theta \cot(\alpha_c + D)$ |
| $e_3 = \dfrac{R \sin(D - \Delta\alpha)}{\cos \alpha_c}$ | $e_3' = \dfrac{R \sin(D - \Delta\alpha)}{\sin \alpha_c}$ |
| $e_4 = \dfrac{R \sin \Delta\alpha}{\cos \alpha_c}$ | $e_4' = \dfrac{R \sin \Delta\alpha}{\sin \alpha_c}$ |
| $e_5 = e_3 + e_4$ | $e_5' = e_3' + e_4'$ |
| $e_6 = \alpha_f' \cdot e_5$ | $e_6' = \alpha_f' \cdot e_5'$ |

The means for generating the cofunctions is readily apparent by observing the switching performed by $S_a$, $S_b$ and by noting that the tap arrangement and switching of divider D1 relies on the equality between $\tan\alpha c$ and $\cotan(90°-\alpha_c)$. Thus the tap supplying tan 33.75° in the first described ranges, provides cotan 56.25° in the second case.

It may be noted that system sensitivity as the null is approached varies as a function of $1/\cos\alpha_c$ or $1/\sin\alpha_c$ depending on the selected intervals.

To illustrate that the described technique is applicable to both manual and automatic bridges, a feedback system FB coupled between the null detector and the coarse and fine controls $T_C$ and $T_F$ is shown. The signal $e_o$ is available for other applications and modes of operation including those mentioned in the introduction.

FIGURE 2

Figure 2:
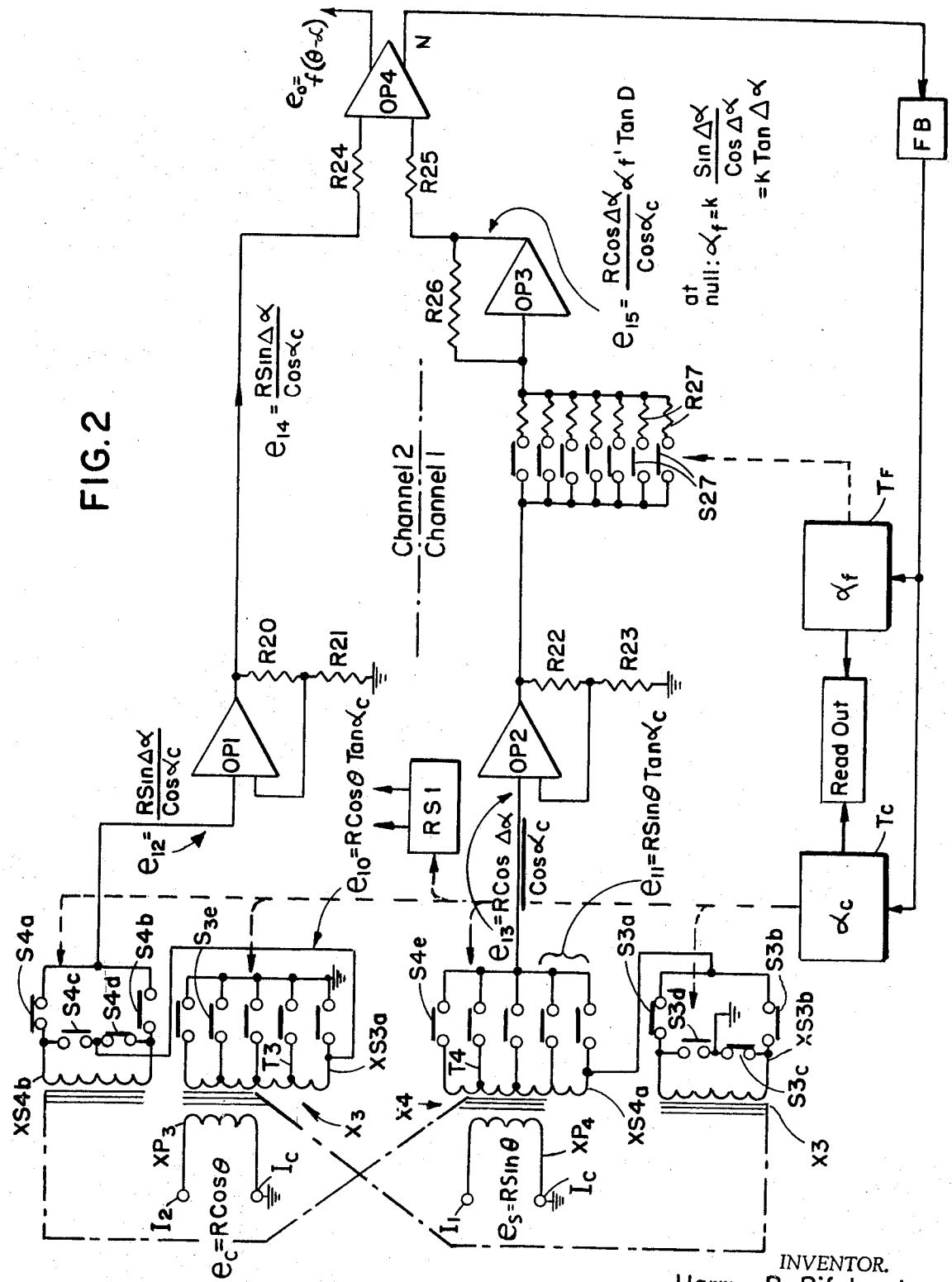
FIG. 2 is a schematic diagram of a second embodiment utilizing operational amplifiers for performing certain functions.

To facilitate switching to ground in the function generation circuits, the embodiment of FIG. 2 generates tangent functions of the coarse trial angle in each channel; it also uses operational amplifiers for combining signals, for scaling and for linear interpolation, and employs single tap selection in the tangent function generators.

The description which follows applies to the case where $\theta$ is in the first, fourth, fifth or eight octants. The sine resolver input $e_s$ appearing between terminals $I_1$ and $I_C$ is applied to the primary of a transformer X4. This transformer includes two tapped secondaries $XS4_a$ and $XS4_b$, functionally in channels 1 and 2, respectively. The cosine resolver input $e_c$ appearing between input terminals $I_2$ and $I_C$ is applied to the primary of transformer X3. This transformer also includes two tapped secondaries $XS3_a$ and $XS3_b$, functionally operative in channels 2 and 1, respectively.

The secondaries $XS3_a$ and $XS4_a$ are tapped and selectively switched to ground to generate tangent $\alpha_c$ functions at 11.25 intervals. As a consequence, a voltage $e_{10}=R\cos\theta \tan\alpha_c$ appears at the output of $XS3_a$ and a voltage $e_{11}=R\sin\theta \tan \alpha_c$ is developed across $XS4_a$. The voltage $e_{10}$ is combined with the voltage $e_s=R\sin\theta$ induced in the secondary $XS4_b$ of X4 yielding the voltage $$e_{12} = \frac{R \sin \Delta\alpha}{\cos \alpha_c}.$$

The secondary $XS4_b$ includes reversing switches $S4_a$, $S4_b$, $S4_c$ and $S4_d$ which in effect interchange the input and output terminals of the secondary as $\alpha_c$ goes from one octant to the next to provide the required sign changes. The switches are also operative in developing the cofunctions generated in the second, third, sixth and seventh octants as described hereafter.

The end terminals of $XS4_b$ may be alternately connected to the input of operational amplifier $OP_1$, depending on the selected coarse angle octant, via the switches $S4_a$ and $S4_b$ which are always in opposite states.

The input to $XS4_b$ is derived from the lower end terminal of $XS3_a$ which is connected to either the upper or lower end terminal of $XS4_b$ depending upon the position of the switches $S4_c$ and $S4_d$. In the position shown, the lower terminal of $XS3_a$ is connected to the lower terminal of $XS4_b$ while the upper terminal of $XS4_b$ is connected to operational amplifier $OP_1$.

In channel 1 a comparable arrangement is employed. Voltage $e_{11}$ across $XS4_a$ is combined with the input voltage $e_c=R\cos\theta$ by coupling $XS4_a$ to secondary $XS3_b$, the latter having induced therein the input voltage $e_c$. A reversing arrangement similar to that employed with $XS4_b$ characterizes the switching of $XS3_b$. Its end terminals are alternatively connected via respective switches $S3_a$ and $S3_b$ to the bottom terminal of secondary $XS4_a$ and via respective switches $S3_c$ and $S3_d$ to the common terminal $I_C$ (ground). In the condition shown the lower terminal of $XS3_b$ is connected to the common terminal while its upper terminal is connected to the lower terminal of $XS4_a$.

The combined output of $XS3_b$ and $XS4_a$ constituting $e_{13}=e_c+e_{11}$ is coupled via the selected tap of $XS4_a$ to the input of operational amplifier OP2.

By virtue of the foregoing arrangements, voltages $e_{12}$ and $e_{13}$ are generated in the two channels such that:

$$e_{12} = \frac{R \sin \Delta\alpha}{\cos \alpha_c},$$

and $$e_{13} = \frac{R \cos \Delta\alpha}{\cos \alpha_c}$$

Operational amplifier OP1 which receives voltage $e_{12}$, provides the required sign change and illustratively includes a scaling network comprising resistors R20 and R21 connected in series and having their junction returned as an input to OP1. The remote end of R20 is connected to the output of OP1 while the remote end of R21 is connected to ground. A similar network comprising resistors R22 and R23 is employed for scaling the signal $e_{13}$ applied to operational amplifier OP2 and inverted thereby. As in the case of the other embodiments, system scaling does not change the computational technique; its affects on coefficients of the processed signals are accordingly not shown in the equations used herein. Sign changes are not shown for the same reason. Thus, $e_{14}$ at the output of OP1 is described as being the same as $e_{12}$. The effects of sign change and system scaling on $e_{15}$ are similarly not shown.

The output $e_{14}$ from OP1 is applied via summing resistor R24 to a summing amplifier OP4 where it is summed with another input representing the interpolated output of OP2.

The output of OP2 is applied to an operational amplifier OP3 having a feedback resistance R26 and a series of summing resistors R27 which can be switched into or out of the input circuit via associated switches S27 in various combinations controlled by the fine angle switching means $T_F$. As a result, the output of OP3 represents the interpolated output of OP2 and can be represented by:

$$e_{15} = \frac{R \cos \Delta\alpha}{\cos \alpha_c} \alpha_f' \cdot \tan D$$

The illustrated increments of $\alpha_f$ are 0.088°.

The output voltage $e_{15}$ of OP3 is applied to OP4 via summing resistor R25 where it is summed with the OP1 output, $e_{14}$, to provide a comparison between the two signals.

When the coarse and fine processor angles have been adjusted to obtain a null at the output of OP4, then $e_{14}=e_{15}$ and $$\alpha_f' = \frac{\sin \Delta\alpha}{\cos \Delta\alpha} \cdot \frac{1}{\tan D},$$

or $$\alpha_f' = \frac{\tan \Delta\alpha}{\tan D}.$$

Since small angles are involved, $\tan\Delta\alpha$ closely approximates $\alpha_f'$, then $\alpha_f \approx \Delta\alpha = \theta - \alpha_c$. Accordingly, the sum of the null values of the coarse and fine processor angles $\alpha_c$ and $\alpha_f$ approximates the input angle $\theta$ to be measured. Compensation can be effected conveniently in the linear interpolator following the procedure described in connection with FIG. 1.

For coarse angle interpolating interval D of 11.25, the interpolating error in the FIG. 2 system varies from zero at D=0 to a maximum of about 200 minutes at approximately D/2 and thence back to zero at D=11.25°. This C-shaped error function is the same as the S-shaped error function over half the S curve interpolating interval characterizing FIG. 1 and also described in the Heaviside application, it being understood that the interval D of the latter is twice that of the former.

As noted previously, the foregoing description applies when $\theta$ lies in the first, fourth, fifth and eighth octants (315°–45°; 135°–225°). In the other octants, the cofunctions listed below are generated by appropriate coarse angle switching circuits RS1 and by operation of the sign-changing switching previously described. Switch circuit RS1 includes a channel-reversing switch for exchanging the inputs to OP1 and OP2 together with other polarity reversing switches connected as dictated by the cofunctions below.

45°–135°; 225°–315°

$e_{10}' = R\cos\theta \cot\alpha_c$
$e_{11}' = R\sin\theta \cot\alpha_c$
$e_{12}' = e_{14}' = R\sin\Delta\alpha/\sin\alpha_c$
$e_{13}' = R\cos\Delta\alpha/\sin\alpha_c$ $$e_{15}' = \alpha_f' \cdot \frac{R\cos\Delta\alpha}{\sin\alpha_c} \cdot \tan D$$

Figure 3:
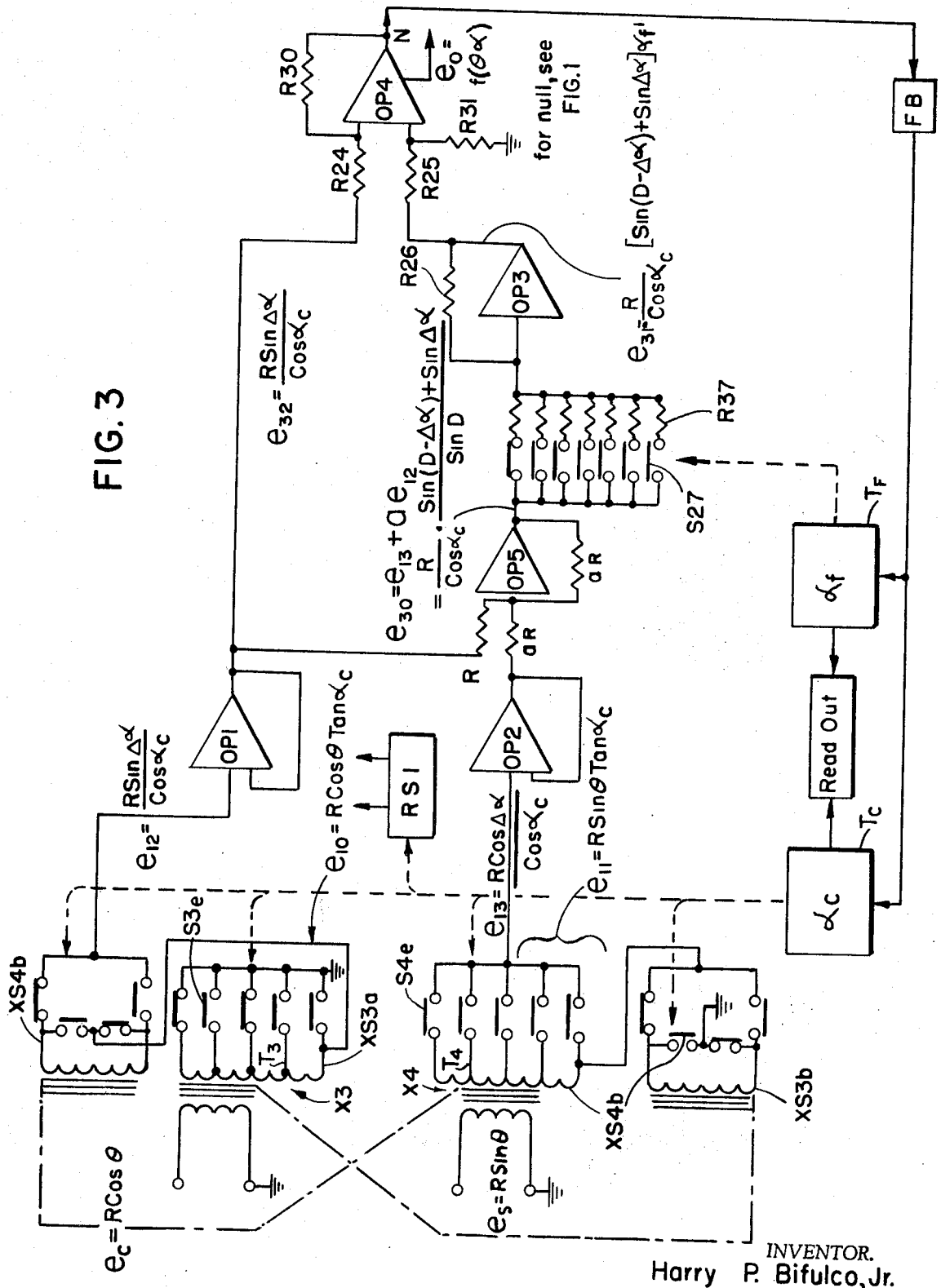
FIG. 3 is a schematic diagram illustrating a third embodiment of the invention.

While the errors in the circuit of FIG. 2 are low for the amount of hardware involved, still greater accuracy may be obtained along with significant economies by modifying the system of FIG. 2 to obtain the embodiment shown in FIG. 3.

FIGURE 3

The system of FIG. 3 is identical with that of FIG. 2 in the operations performed on the resolver inputs $e_s$ and $e_c$ by the coarse trial angle functions $\tan\alpha_c$ (and $\cotan\alpha_c$) to derive the functions of $e_{12}$ and $e_{13}$. The mechinization differs thereafter. First, as can be seen in FIG. 3, the scaling networks associated with OP1 and OP2 have been eliminated to provide unity gain and the outputs of these two amplifiers are combined before interpolation in an operational amplifier OP5. This amplifier receives the output of OP1 via summing resistor R and the output of OP2 via summing resistor $aR$. The feedback resistor of OP5 is set at a value equal to $aR$ and "$a$" is set equal to $(1-\cos D)/\sin D$ with the result that the net output from OP5 represents the function:

$$e_{30} = e_{13} + ae_{12} = \frac{R}{\cos\alpha_c} = \frac{(\sin(D-\Delta\alpha) + \sin\Delta\alpha)}{\sin D}.$$

This function is then interpolated by applying voltage $e_{30}$ to the interpolating stage employing the previously described amplifier OP3. Interpolating amplifier OP3 is configured as it was in the case of FIG. 2 and supplies an input to OP4 via R25. This input, $e_{31}$, represents $e_{30}$ multiplied by the normalized fine angle setting $\alpha_f'$.

By eliminating the constant $1/\sin D$, as by selecting the appropriate value for R26, the function becomes $$e_{31} = \frac{R}{\cos\alpha_c} \cdot [\sin(D-\Delta\alpha) + \sin\Delta\alpha] \cdot \alpha_f'$$

This is the same function that is represented by $e_6$ of FIG. 1 and yields the same S-shaped interpolating error characteristics.

As in the case of FIG. 2, the output, $e_{32}$, of OP1 is summed with $e_{31}$ in summer OP4 via the resistance R24. Stage OP4 includes a feedback resistor R30, and a resistance R31 connected from the summing junction side of R25 to ground for scaling.

When the coarse and fine trial angles are adjusted to a null condition at the output of OP4, then $e_{32}=e_{31}$ (excluding scaling effects) and $$\frac{R\sin\Delta\alpha}{\cos\alpha_c} = \frac{R(\sin(D-\Delta\alpha) + \sin\Delta\alpha)}{\cos\alpha_c} \cdot \alpha_f'$$

Accordingly, $$\alpha_f' = \frac{1}{\frac{\sin(D-\Delta\alpha)}{\sin\Delta\alpha} + 1}$$

This function is the same as the one obtaining with respect to FIG. 1. The interpolation error is of the S-shaped type described in connection with FIG. 1 and the previously mentioned Heaviside application; it has a maximum value of about 25″ for D=11.25°, which is ⅛th that of the FIG. 2 circuit. By modifying the total input resistance in the interpolator OP3, the error is readily compensated.

To generate the required cofunctions in the second, third, sixth and seventh octants, the system of FIG. 3 employs the switching techniques of FIG. 2.

In the embodiments heretofore described it has been necessary to employ tapped dividers with tap distribution and tap selection controlled to provide the $\tan\alpha_c$ (or $\cotan\alpha_c$) functions.

The system equations controlling the embodiments of FIGS. 2 and 3 in an illustrative interval are:

$I = \cos\theta \sin\theta \tan\alpha_c$ and
$S = \sin\theta \cos\theta \tan\alpha_c$, where the function $I$ is generated in the interpolation channel and $S$ in the other channel (not to be confused with the S-shaped error function).

By interpolating $I$ as a function of $\alpha_f$ and nulling the resultant with the $S$ signal, the angle $\theta$ was computed in the embodiment of FIG. 2 while in the case of FIG. 3 the $I$ signal was modified by the $S$ signal before interpolation to improve the error characteristic.

Figure 4:
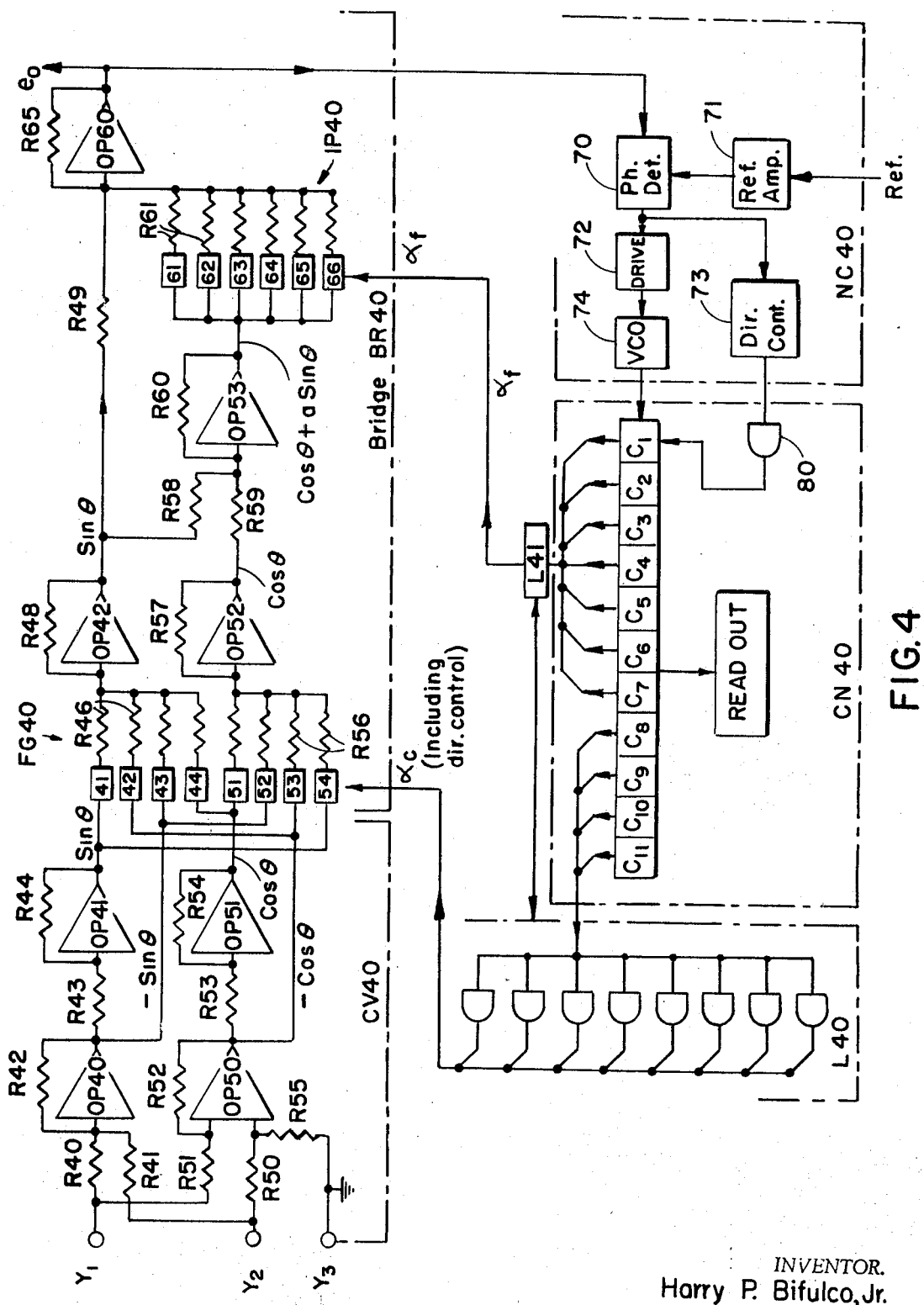
FIG. 4 is a schematic diagram of a system employing the general technique of FIG. 3 in an automatic bridge which is also capable of processing synchro inputs, and which is operable without the need for tapped dividers.

The embodiment of FIG. 4 is based on the recognition that: (1) the tangent factor in the above listed $I$ and $S$ functions reduces to the values 0 or 1 where $\alpha_c$ is restricted to 0° and multiples of 45°; (2) that the relatively large error associated with a 45° interpolation interval can be reduced by interpolating $\pm 22.5°$ in an up/down fashion about the coarse angle setting; and (3) still further reduction in error can be achieved by utilizing the cross coupling techniques of FIG. 3.

As a consequence of item (1) above, no dividers or taps are required, the generator of $I$ & $S$ being reduced to simple combinations of the input functions $\cos\theta$ and $\sin\theta$.

Thus, for the values $\alpha_c=0°$ and 45°, the $I$ & $S$ functions become:

$\alpha_c=0°$  $\alpha_c=45°$
$I=\cos\theta$   $I=\cos\theta+\sin\theta$
$S=\sin\theta$   $S=\sin\theta-\cos\theta$*(*The factor $R$ has been omitted from the following discussions for the sake of simplification.)

This approach thus permits the generation of the $I$ & $S$ functions by simple summing circuits without the need for trigonometric dividers or other trigonometric computing elements while at the same time providing the low error features.

FIGURE 4

The system of FIG. 4 combines a bridge with a converter and automatic feedback system. The converter CV40 is designed to adapt the resolver bridge BR40 to the processing of synchro data and to this end converts the data in synchro form to equivalent data represented in resolver form.

The feedback system includes a counter CN40 and decoding circuits L40, L41 for controlling the adjustments of the coarse and fine processor angles in response to a signal derived from the null circuit NC40. By virtue of this arrangement an automatic conversion of synchro data to equivalent digital data is provided.

The general data flow is initiated at the input terminals $Y_1$, $Y_2$ and $Y_3$ which receive the synchro voltages. These synchro voltages are converted in the synchro-to-resolver converter CV40 into equivalent resolver voltages which are applied in turn to the bridge circuit BR40.

The bridge employs a function generator FG40 and linear interpolator IP40 adjusted respectively by a coarse angle input $\alpha_c$, and a fine angle input $\alpha_f$, and drives a null detector NC40.

The null detector operates a BCD counter CN40 which controls in turn the values of the coarse and fine processor angles via the decoders L40 and L41 respectively.

When a null condition has been established, the state of the counter CN40 provides a digital representation of the input synchro angle which may be read out as indicated. To digitize resolver inputs, converter CV40 is bypassed.

The synchro-to-resolver converter CV40 employs two channels, one comprising the cascaded operational amplifiers OP40 and OP41, and the other, the similarly cascaded amplifiers OP50 and OP51.

The input operational amplifier OP40 receives the voltages appearing at terminals $Y_1$ and $Y_2$ via the respective summing resistors R40 and R41. The amplifier is provided with a feedback resistance R42. The output of OP40 is coupled via R43 to the input of OP41 which also includes a feedback resistance R44.

The output of OP41 is supplied to the bridge circuit and, specifically, to the switches 41 and 54 of the bridge function generator FG40. The output of OP40 also directly supplies the switching network of the bridge, being connected to the switch circuits 43 and 52.

The other channel of the converter, consisting of the amplifiers OP50 and 51 is supplied by the voltage appearing at $Y_1$ which through summing resistor R51 is coupled to OP50, and the voltage appearing at $Y_2$ which is coupled to OP50 via resistance R50. The summing junction side of R50 is returned to the input ground terminal $Y_3$ via resistance R55.

Operational amplifier OP50 includes a feedback resistance R52 and has its output coupled via resistance R53 to the operational amplifier OP51 having feedback resistance R54. The output of OP50 also directly supplies the switching circuits 53 and 42 in the bridge function generator FG40.

The output of OP51 also feeds the coarse processor angle switching system of BR40, being connected to the switching circuits 51 and 44.

The input summing and feedback resistances of the various operational amplifiers in the converter CV40 are assigned values required to provide the conversion of the input data from synchro form to resolver form. Letting the values of R43, 44, 52, 53, 54 and 55 assume a resistance "R," the remaining resistances are assigned the following values to achieve this conversion:

R40 and R41 = $\sqrt{3R}$
R50 and R51 = 2R
R42 = R/2

While a converter employing single-ended input stages has been shown, differential input stages may also be utilized.

computational techniques following that previously described at the end of the description of FIG. 3. As noted there, the coarse angle $\alpha_c$ dividers have been replaced by summing amplifier circuits.

One of the sets of coarse angle function generators comprises the switching circuits 41 through 44 which control the insertion of the associated resistances R46 in circuit with the summing junction of the operational amplifier OP42, the values of the resistances being equal. The switches are actuated by way of a control signal representing $\alpha_c$ which is derived from the decoder L40 which is controlled in turn by the four most significant digits in the counter CN40.

The switching of the switching elements 41 through 44 and the values of the associated resistances R46 are such as to generate the tangent $\alpha_c$ and cotangent $\alpha_c$ functions as was done in the case of the previously described embodiments. These functions form products with the $\pm \sin\theta$ and $\pm \cos\theta$ functions derived from the converter CV40 to yield the $\theta$, $\alpha_c$ functions. However, since $\alpha_c$ is restricted to values of zero and multiples of 45°, the values of the tangent and cotangent factors reduce to zero or unity. The net functions and cofunctions thus become simply combinations of the resolver inputs $\pm \sin\theta$ and $\pm \cos\theta$.

Thus, switches 41 and 43 are energized at the appropriate values of $\alpha_c$ to supply oppositely phased sine $\theta$ functions while the switches 42 and 44 couple the oppositely phased cosine $\theta$ functions when they are energized. The resistances 46 and amplifier 42 sum these signals to form various combination for each value of $\alpha_c$.

A similar arrangement characterizes the switching elements 51 through 54 and associated equal resistances R56 in the other channel of the bridge. Accordingly, the functions listed below appear at the outputs of the operational amplifier OP42 and OP52.

| Coarse angle | S (OP42) signal | I (OP52) signal |
|---|---|---|
| 0–22.5 | $\dfrac{\sin\theta}{\cos 0} = \sin\theta$ | $\dfrac{\cos\theta}{\cos 0} = \cos\theta$ |
| 22.5–45 | $\dfrac{\sin(\theta-45)}{\cos 45} = -(\sin\theta - \cos\theta)*$ | $\dfrac{\cos(\theta-45)}{\sin 45} = \cos\theta + \sin\theta$ |
| 45–67.5 | $\dfrac{\sin(\theta-45)}{\sin 45} = \sin\theta - \cos\theta$ | $\dfrac{\cos(\theta-45)}{\sin 45} = \cos\theta + \sin\theta$ |
| 67.5–90 | $\dfrac{\sin(\theta-90)}{\sin 90} = \cos\theta *$ | $\dfrac{\cos(\theta-90)}{\sin 90} = \sin\theta$ |
| 90–112.5 | $\dfrac{\sin(\theta-90)}{\sin 90} = -\cos\theta$ | $\dfrac{\cos(\theta-90)}{\sin 90} = \sin\theta$ |
| 112.5–135 | $\dfrac{\sin(\theta-135)}{\sin 135} = \sin\theta + \cos\theta *$ | $\dfrac{\cos(\theta-135)}{\sin 135} = -\cos\theta + \sin\theta$ |
| 135–157.5 | $\dfrac{\sin(\theta-135)}{\cos 135} = \sin\theta + \cos\theta$ | $\dfrac{\cos(\theta-135)}{\cos 135} = \cos\theta - \sin\theta$ |
| 157.5–180 | $\dfrac{\sin(\theta-180)}{\cos 180} = -\sin\theta *$ | $\dfrac{\cos(\theta-180)}{\cos 180} = \cos\theta$ |
| 180–360 | above functions repeat. | |

The bridge circuit BR40 includes a pair of channels as described in connection with the previous figures, the specific The above table reflects not only the effects of generating tangent functions at 45° intervals, but also indicates the changes necessary at increments of 22.5° to accomplish bidirectional interpolations, i.e., to indicate to the system which direction to interpolate.

The same bidirectional interpolation technique can also be practiced in the other illustrated embodiments.

* Polarity reversed to meet direction control requirements.

The output of OP42 is fed to the summing amplifier OP60 via the summing resistor R49, while the output of OP52 is coupled via summing amplifier OP53 and the interpolating divider, OP40 to the same summer OP60.

A coupling between the channels is provide, being similar to that shown in FIG. 3 and embodied as resistance R58 which couples the output of OP42 to the input of OP53. Resistances R58, R59 and R60 correspond to the resistances designated R, aR and aR in FIG. 3.

The output of OP53 is coupled to the linear, compensated interpolator IP40 which comprises a set of switches 61 through 66 with associated weighted summing resistances R61. These switching elements are controlled by the least significant digits of the counter CN40 to insert different combinations of resistance R61 in the input circuit of OP60 to thereby provide the fine angle $\alpha_f'$ adjustment of the interpolator.

As previously noted, the output of the interpolator is coupled to the summing junction of OP60 where it is combined with the signal from OP42.

The output of OP60 is fed to the null circuit NC40 and, specifically, to the phase detector 70 thereof. The detector is also supplied with a reference input via a reference amplifier 71 in conventional manner and supplies a DC of one or the other polarity above and below the null condition.

The output of the phase detector is coupled to a driver circuit 72 for supplying a voltage-controlled oscillator 74 with a driving signal when above or below the null. The oscillator 74 initiates counting operations in the counter CN40 at a rate approximately proportioned to the magnitude of the bridge error.

The output of the detector also supplies a polarity-sensitive direction control circuit 73 which, via driver 80 in the counter CN40, controls the direction of count.

The counter CN40 illustratively includes 11 stages of which the first seven, C1 through C7, provide the fine angle $\alpha_f$ control via decoder L41. The most significant digits C8 through C11 on the other hand supply the coarse processor angle adjustment via the decoder circuit L40. L40 translates the binary coded signals from stages C8 through C11 into switching signals for controlling the coarse angle function generator FG40 in the bridge BR40 while L41 provides the analogous function for fine angle adjustment. Appropriate logic circuits coordinate L40 and L41.

It should be noted that the system of FIG. 4 has the ability to process DC inputs. Furthermore, the choice of operational amplifiers and feedback and logic elements in the circuit of FIG. 4 permit this system to be fabricated substantially in LSI configuration Moreover, in spite of its simplicity, the circuit produces a resolver-to-digital conversion having very low interpolation errors, there being a reduction of the error to 1/64th the value which occurs in the case of an unmodified tangent technique employing a unidirectional 45° interpolation scheme. Those interpolation errors which do exist in FIG. 4 are compensated for most points by adjustment of the values of resistance R61 in the manner previously described.

Besides being applicable to the diverse functions described in the introduction, the invention, in analogy to the CT, can also serve as a data generator. For example, when $\theta$ has a value of 0°, the input signals become simply 0 and R. The latter may be regarded as a single constant input for purposes of data generation. Under these conditions, the illustrated embodiments supply output signals representative of the processor angle only.

What is claimed is:

1. Apparatus for processing signal inputs representing angular data $\theta$ comprising:
    1. means for generating representations of coarse processor angle $\alpha_c$,
    2. means generating tangent-type functions and connected to be controlled by said coarse angle generating means for generating tangent-type functions of said coarse angle,
    3. a first signal computing circuit interconnecting said inputs and function generating means for processing said inputs and generated functions to generate a first signal,
    4. a second signal computing circuit interconnecting said inputs and function generating means for processing said inputs and generated functions to generate a second signal,
    5. means for generating representations of fine processor angle $\alpha_f$,
    6. interpolating means connected to said first signal computing circuit and said fine angle generating means for interpolating said first signal as a function of fine angle $\alpha_f$ to develop a third signal, and
    7. means combining said second and third signals to derive an output indicative of the relationship between $\theta$, $\alpha_c$ and $\alpha_f$.

2. Apparatus as defined in claim 1 in which said interpolating means include a linear interpolator, said first signal is nonlinear, and wherein said first signal bears a relationship to said second signal such that interpolating errors are independent of the adjusted setting of said coarse angle generating means.

3. Apparatus as defined in claim 2 in which said relationship is such that $\alpha_f$ varies as a function of $\tan(\theta-\alpha_c)$ over at least a portion of the interpolating interval.

4. Apparatus as defined in claim 1 including switching means in said first and second signal computing circuits connected to be controlled by said coarse angle generating means to vary the interconnection of said inputs and function generating means in dependence on the adjusted value of said coarse angle.

5. Apparatus as defined in claim 1 in which said first and second computing circuits include means for producing bidirectional interpolation.

6. Apparatus as defined in claim 1 including means responsive to said combining means for signalling the sum of the adjusted values of said coarse and fine angle generating means.

7. Apparatus as defined in claim 1 in which said first and second signals each include the factor $1/\cosine\alpha_c$ for one range of $\alpha_c$, and $1/\sin\alpha_c$ for another range of $\alpha_c$.

8. Apparatus as defined in claim 1 in which said first and second signals each include representations of a trigonometric function of $(\theta-\alpha_c)$.

9. Apparatus as defined in claim 1 in which the increments of said coarse angle are greater than the operating range of said interpolating means.

10. Apparatus for computing the relationship between angular data $\theta$ represented by two input signals, and processor angle data $\alpha$ represented as coarse and fine component angles, $\alpha_c$ and $\alpha_f$, respectively comprising:
    1. tangent function generating means including tapped divider means supplying parameters representing the tangent and cotangent values of $\alpha_c$,
    2. computing means for processing said input signals by said tangent function generating means to generate two signals the ratio of which is a function of $(\theta-\alpha_c)$ but independent of $\alpha_c$,
    3. interpolating means controlled by a representation of $\alpha_f$ for interpolating one of said computed signals, and
    4. means jointly responsive to said other computed signal and said interpolate signal for deriving an output indicative of the relationship between $\alpha$ and $\theta$.

11. Apparatus as defined in claim 10 in which both of said computed signals are dependent in one operating range on $1/\cosine\alpha$ and in another range on $1/\sin\alpha_c$ but their ratio in any range is independent of $\alpha_c$.

12. Apparatus as defined in claim 10 in which said function generating means include tap selection means operable to select tangent functions at taps of said divider means through certain octants and cotangent functions at said same taps in other octants.

13. Apparatus as defined in claim 10 including means operable at 45° intervals of $\alpha_c$ to vary the combining of said tangent function generating means and said input signals.

14. Apparatus as defined in claim 10 in which one of said computed signals is a function of the sine of $(\theta-\alpha_c)$.

15. Apparatus as defined in claim 10 in which said function generating means include signal tap selection means controlled by said coarse angle $\alpha_c$.

16. Apparatus for computing relationships between angular data $\theta$ represented by two input signals, and processor angle data $\alpha$ represented by coarse and fine components $\alpha_c$ and $\alpha_f$, respectively, comprising:
  1. tangent function generating means,
  2. constant means interconnecting said function generating means and said inputs to derive first and second signals representing factors $[\sin(D-\Delta\alpha) + \sin \Delta\alpha]$ and $\sin \Delta\alpha$, respectively, where D is a constant and $\Delta\alpha=\theta-\alpha_c$,
  3. means for interpolating said first signal, and
  4. means combining said interpolated signal and said second signal for computing said relationship.

17. Apparatus as defined in claim 16 in which said first and second signals both also represent alternatively the factors $1/\cos\alpha_{ac}$ and $1/\sin\alpha_c$.

18. Apparatus as defined in claim 16 in which said first and second signals represent the factors $[\sin(D-\Delta\alpha) + \sin\Delta\alpha]/f(\alpha_c)$ and $\sin \Delta\alpha/f(\alpha_c)$, respectively, where $f(\alpha_2)$ is a trigonometric function of $\alpha_c$.

19. Apparatus as defined in claim 16 in which said combining means comprises mean for summing said first and second signals such that when $\alpha_c$ and $\alpha_f$ are adjusted to null said first and second signals, then $\alpha_f$ is proportional to $$\frac{1}{\frac{\sin(D-\Delta\alpha)}{\sin \Delta\alpha}+1},$$

when the effect of interpolation error correction is excluded.

20. Apparatus according to claim 16 including means for modifying said first signal by said second signal.

21. Apparatus for computing relationships between angular date $\theta$ represented by signals $f_1(\theta)$ and $f_2(\theta)$, and processor angle data $\alpha$ represented by coarse and fine processor angles $\alpha_c$ and $\alpha_f$, respectively, comprising:
  1. summing means for deriving first and second signals,
  1a. means for generating functions of $\tan\alpha_c$ and $\cot\alpha_c$,
  2. switching means controlled by the functions $\tan\alpha_c$ and $\cot\alpha_c$ at 45° intervals of $\alpha$ for selectively coupling combinations of said signals $f_1(\theta), f_2(\theta)$ to said summing means,
  3. interpolating means connected to interpolate said first derived signal as a function of $\alpha_f$, and
  4. means combining said interpolated signal and said second derived signal for computing said relationships.

22. Apparatus as defined in claim 21 in which said interpolating means include a linear interpolator and in which the relationship between said first and second derived signals yields an interpolation error characteristic which is independent of the adjusted value of $\alpha_c$.

23. Apparatus as defined in claim 22 including means for modifying said first derived signal by said second derived signal for improving said error characteristic.

24. Apparatus as defined in claim 22 including means coupled to said linear interpolator for compensating said error characteristic.

25. Apparatus as defined in claim 21 in which the interpolation interval is different from the coarse angle interval and interpolation is bidirectional.

26. Apparatus as defined in claim 21 in which said first and second derived signals represent factors including $\sin \Delta\alpha$ where $\Delta\alpha=\theta-\alpha_c$.

27. Apparatus as defined in claim 21 in which said first and second derived signals represent factors including $$\frac{\sin(D-\Delta\alpha) + \sin \Delta\alpha}{f(\alpha_c)}$$

and $\sin\Delta\alpha/f(\alpha_c)$, respectively, D being a constant and $f(\alpha_c)$ being alternatively $\cos\alpha_c$ and $\sin\alpha_c$.

28. Apparatus as defined in claim 21 in which said interpolating means comprise a linear interpolator and wherein for the adjusted values of $\alpha_c$ and $\alpha_f$, the value of $\alpha_f$ is proportional to $$\frac{1}{\frac{\sin(D-\Delta\alpha)}{\sin \Delta\alpha}+1}$$

where D is the interpolating interval and $\Delta\alpha=\theta-\alpha_c$.

29. Apparatus as defined in claim 21 including means for automatically adjusting said switching means and interpolating means in accordance with the output of said combining means.

30. Apparatus as defined in claim 29 in which said automatic adjustment means include a variable frequency oscillator, the frequency of which is controlled by the output of said combining means.

31. The process of deriving data from input signals representing angle $\theta$ without the need for computation elements for generating functions having values other than zero or unity ($\pm1$) comprising the steps of:
  1. generating two signals representing summations of said input signals in accordance with the zero and unity values ($\pm1$) of tangent and cotangent of a coarse processor angle $\alpha_c$,
  1a. modifying one of said signals by the other to permit linear interpolation with reduced error,
  2. linearly interpolating said modified signal as a function of a fine processor angle $\alpha_f$, and
  3. combining said interpolated signal and said other signal to derive said data.

32. The process as defined in claim 31 in which said two signals are generated such that the interpolation error is independent of the adjusted value of said coarse processor angle.

33. The process as defined in claim 31 in which said signal generation consists essentially of summation and inversion.

34. The process as defined in claim 31 in which one of said generated signals is modified to control the interpolation interval and in which said interpolation interval is less than the interval between said coarse processor angle values.

35. The process as defined in claim 31 in which said generated signals are combined to establish a null condition.

36. The process as defined in claim 31 in which said interpolated signal is compensated for interpolation errors.

37. The process as defined in claim 31 in which said two signals are generated such that each includes the factor $1/\cos\alpha$ for certain values of $\alpha_c$ and $1/\sin\alpha_c$ for other values.

38. The process as defined in claim 31 in which said two signals are generated such that each includes the factor $\sin\Delta\alpha$ where $\Delta\alpha=\theta-\alpha_c$.

39. The process as defined in claim 21 in which said two signals are generated and interpolated such that, when equal $$\alpha_f \doteq \frac{1}{\frac{\sin(D-\Delta\alpha)}{\sin \Delta\alpha}+1}$$

where $\Delta\alpha=\theta-\alpha_c$ and D is the interpolation interval.

40. Bridge apparatus for processing angular data represented by sine and cosine signals $R\sin\theta$ and $R\cos\theta$, to derive related processor angle data $\alpha$, represented by coarse and fine processor angles $\alpha_c$ and $\alpha_f$, comprising:
  1. coarse angle generating means for generating representations of $\alpha_c$,
  2. fine angle generating means for generating representations of $\alpha_f$,
  3. tangent function generating means adjusted by said coarse angle generating means for computing tangent $\alpha_c$ and cotangent $\alpha_c$,
  4. switching means controlled by said coarse angle generating means for alternatively coupling said cosine and sine signals to said tangent function generating means and for deriving first and second signals therefrom,
  5. first combining means for combining said first signal with said sine and cosine signals alternatively, to derive a first computation signal, 6. second combining means for combining said second signal with said sine and cosine signals alternatively and with a signal derived from said first combining means, 7. means for modifying the signal derived in said second combining means as a function of cosine $\alpha_c$ to derive a second computation signal, 8. means including a linear interpolator controlled by said fine angle generating means for interpolating said second computation signal to derive an interpolated signal, and 9. detection means responsive to said first and interpolated signals to detect the relationship between $\theta$ and $\alpha$.

41. Apparatus as defined in claim 40 in which said tangent function generating means comprise a tapped divider having tap selection means for supplying said first and second signals.

42. Apparatus as defined in claim 40 in which said first and second combining means each comprise transformer means.

43. Apparatus as defined in claim 40 in which said second combining means and modifying means comprise the primary and tapped secondary of transformer means, respectively, the latter also including tap selection means controlled by said coarse angle generating means.

44. Apparatus as defined in claim 40 in which said first and second signals, for certain values of $\alpha_c$, are proportional respectively to $RCos\theta Tan\alpha_c$ and $RCos\theta Tan (\alpha_c+D)$ where $D$ is the interval between coarse angle values.

45. Apparatus as defined in claim 40 in which said first and second computation signals respectively include representations of the factors $RSin(\Delta\alpha)$ and $R[Sin (D-\alpha\Delta) +Sin\Delta\alpha]$, where $\Delta\alpha=\theta-\alpha_c$.

46. Apparatus as defined in claim 40 including means coupled to said interpolating means for compensating for interpolation error.

47. Bridge apparatus for processing angular data represented by sine and cosine signals $RSin\theta$ and $RCosine\theta$ to derive related processor angle data $\alpha$ represented by coarse and fine processor angles $\alpha_c$ and $\alpha_f$, respectively, comprising:

1. coarse angle generating means for generating representations of $\alpha_c$,
2. fine angle generating means for generating representations of $\alpha_f$,
3. first tangent function generating means controlled by said coarse angle generating means and connected to respond to said cosine signal to derive a first signal,
4. second tangent function generating means controlled by said coarse angle generating means and connected to respond to said sine signal to derive a second signal,
5. first combining means for combining said first signal with said sine signal to derive a first computation signal,
6. second combining means for combining said second signal with said cosine signal to derive a second computation signal,
7. interpolating means coupled to said fine angle generating means and including a linear interpolator connected to interpolate one of said computation signals to drive an interpolated signal, and
8. detecting means for combining the other computation signal and said interpolated signal to detect the relationship between $\theta$ and $\alpha$.

48. Bridge apparatus as defined in claim 4 in which said first and second tangent function generating means each comprise tapped divider means.

49. Bridge apparatus as defined in claim 47 in which said first and second tangent function generating means each comprise a transformer having a primary energized by the respective sine or cosine signal and a tapped secondary having tap selection means controlled by said coarse angle generating means.

50. Apparatus as defined in claim 47 including polarity reversing switching means in each of said first and second combining means, said reversing means being controlled by said coarse angle generating means.

51. Apparatus as defined in claim 47 in which said first and second signals represent the factors $Cos\theta Tan\alpha_c$ and $Sin\theta Tan\alpha_c$, respectively, for certain values of $\alpha_c$.

52. Apparatus as defined in claim 47 in which said first and second computation signals represent the factors $Sin\Delta\alpha/Cos\alpha_c$ and $Cos\Delta\alpha/Cos\alpha_c$ for certain values of $\alpha_c$.

53. Apparatus as defined in claim 47 including means for including in the computational signal which is interpolated, a portion of the other computational signal for improving the accuracy of interpolation.

54. Apparatus as defined in claim 53 in which said modifying means supplies said portion according to the factor $(1-Cos\ D)/Sin\ D$, where D is a constant relating to the interpolation interval.

55. Apparatus as defined in claim 53 in which said computational signal which is interpolated includes the factor $$\frac{R}{\cos\alpha_c} \cdot \frac{\sin(D-\Delta\alpha)+\sin\Delta\alpha}{\sin D}$$

where D represents the interpolation interval and $\Delta\alpha=\theta-\alpha_c$.

56. Apparatus as defined in claim 55 in which said other computational signal includes the factor $RSin\Delta\alpha/Cos\alpha_c$.

57. Apparatus supplied with reference input R for processing angular data comprising:

1. means for generating representations of coarse processor angle $\alpha_c$,
2. means generating tangent-type functions and connected to be controlled by said coarse angle generating means for generating tangent-type functions of said coarse angle,
3. a first signal computing circuit interconnecting said input and function generating means for computing a first signal,
4. a second signal computing circuit interconnecting said input and function generating means for computing a second signal,
5. means for generating representations of fine processor angle $\alpha_f$,
6. interpolating means connected to said first signal computing circuit and said fine angle generating means for interpolating said first signal as a function of fine angle $\alpha_f$ to develop a third signal, and
7. means combining said second and third signals to derive an output indicative of the relationship between R, $\alpha_c$ and $\alpha_f$.

58. Apparatus as defined in claim 57 in which said interpolating means include a linear interpolator, said first signal is nonlinear, and wherein said first signal bears a relationship to said second signal such that interpolating errors are independent of the adjusted setting of said coarse angle generating means.

59. Apparatus as defined in claim 58 in which said relationship is such that $\alpha_f$ varies as a function of $tan\alpha_c$ over at least a portion of the interpolating interval.

60. Apparatus as defined in claim 57 including switching means in said first and second signal computing circuits connected to be controlled by said coarse angle generating means to vary the interconnection of said input and function generating means in dependence on the adjusted value of said coarse angle.

61. Apparatus as defined in claim 57 in which said first and second computing circuits include means for producing bidirectional interpolation.

62. Apparatus as defined in claim 57 in which said first and second signals each include the factor $1/cosine\alpha_c$ for one range of $\alpha_c$, and $1/sin\alpha_c$ for another range of $\alpha_c$.

63. Apparatus as defined in claims 57 in which said first and second signals each include representations of a trigonometric function of $\alpha_c$.

64. Apparatus as defined in claim 57 in which the increments of said coarse angle are greater than the operating range of said interpolating means.

* * * * *

UNITED STATES PATENT OFFICE
CERTIFICATE OF CORRECTION

Patent No. 3,646,337  Dated February 29, 1972

Inventor(s) Harry P. Bifulco, Jr.

It is certified that error appears in the above-identified patent and that said Letters Patent are hereby corrected as shown below:

Abstract, penultimate line, "of", first occurrence, should read -- or --;

Column 1, line 35, after "equals" insert -- θ. --;

Column 7, line 33, "=", third occurrence, should read -- · --;

Column 8, lines 35 to 37, the equations should not run together, but should appear in column form as follows:

$$\underline{\alpha_c = 0°} \qquad \underline{\alpha_c = 45°}$$

$$I = \cos\theta \qquad I = \cos\theta + \sin\theta$$
$$S = \sin\theta \qquad S = \sin\theta - \cos\theta*;$$

Column 9, line 56, "sin θ0" should read -- sin 90 --;

Column 12, line 68, "1/cosine $\alpha$" should read -- 1/cosine $\alpha_c$ --;

Column 13, line 12, delete the word "constant";

Column 13, line 21, "1/cos $\alpha_{aq}$" should read -- 1/cos $\alpha_{ac}$ --;

Column 13, line 24, "f($\alpha_2$)" should read -- f($\alpha_c$) --;

Column 13, line 44, "$\alpha$" should read -- $\alpha_c$ --;

Column 14, line 47, "1/cos $\alpha$" should read -- 1/cos $\alpha_c$ --; and

Column 15, line 60, "4" should read -- 47 --.

Signed and sealed this 18th day of July 1972.

(SEAL)
Attest:

EDWARD M. FLETCHER, JR.  ROBERT GOTTSCHALK
Attesting Officer  Commissioner of Patents